United States Patent Office 3,433,319
Patented Mar. 18, 1969

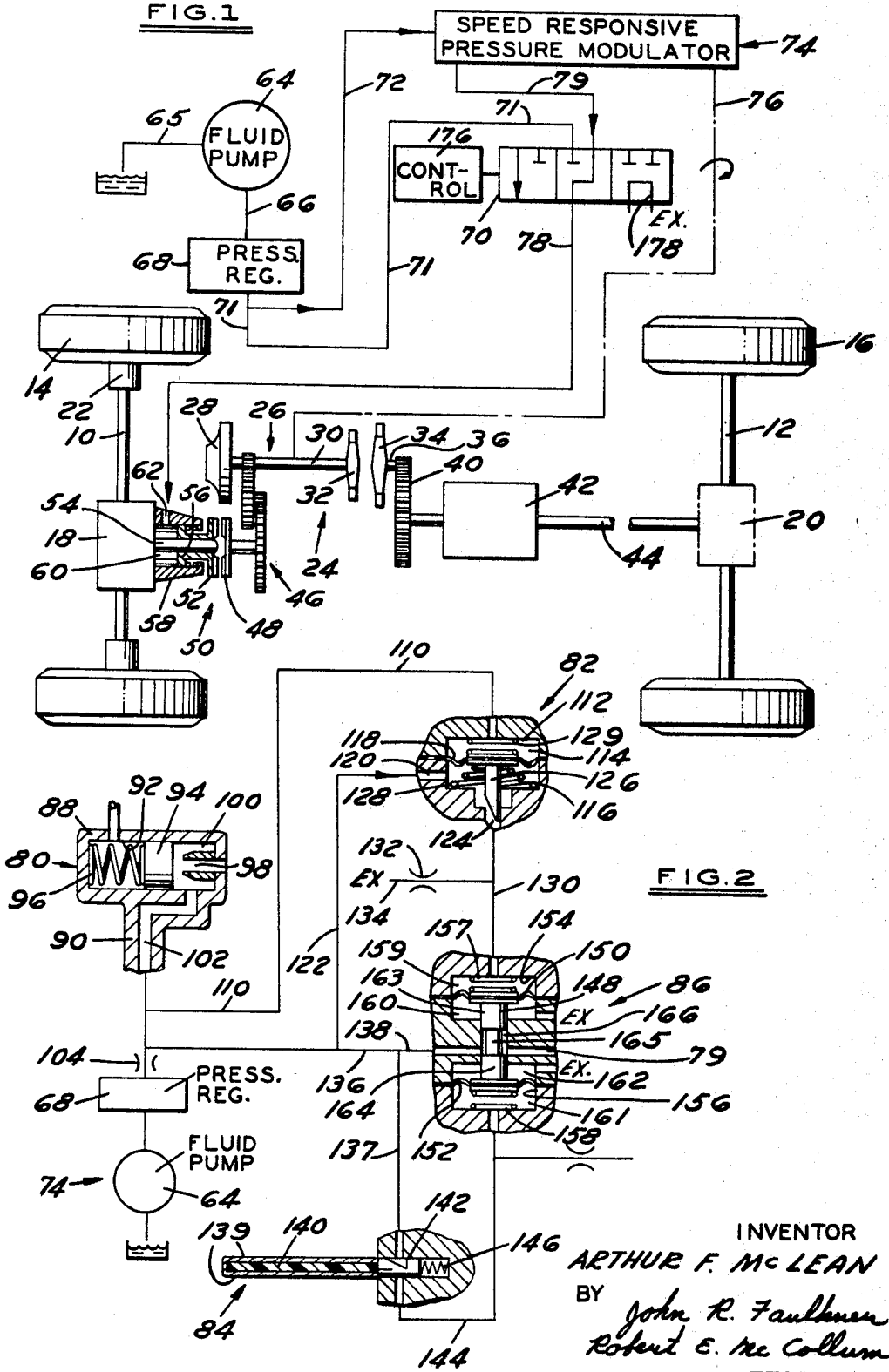

3,433,319
FOUR-WHEEL DRIVEN GAS TURBINE VEHICLE WITH CLUTCH-CONTROLLED DRIVE TO FRONT AXLE
Arthur F. McLean, Livonia, Mich., assignor to Ford Motor Company, Dearborn, Mich., a corporation of Delaware
Filed Oct. 2, 1967, Ser. No. 672,269
U.S. Cl. 180—44    5 Claims
Int. Cl. B60k 17/02, 3/04, 17/34

ABSTRACT OF THE DISCLOSURE

A two/four-wheel drive arrangement for a motor vehicle driven by a gas turbine engine in which a conventional drive train connects the output shaft of a free power turbine type engine to one of the driving axles, the engine being connected to the other driving axle by a slippable clutch that, selectively, can: be fully engaged to provide engine braking for the vehicle; be completely disengaged to permit rapid acceleration of the gasifier section of the turbine engine; or the slip can be controlled automatically to maintain a predetermined operation of the gas turbine engine.

---

This invention relates, in general, to a motor vehicle driven by a gas turbine engine. More particularly, it relates to a two/four-wheel drive arrangement for a motor vehicle driven by a gas turbine engine.

Automotive type gas turbine engines generally are of the free power turbine type. That is, generally, they contain a gasifier section including a compressor and a compressor turbine rotatable together by means of an interconnecting shaft, and a freely rotatable power turbine generally connected to the power input of a conventional drive train or to the driving wheels of the motor vehicle.

Gas turbine engines of the above type generally are operated so as to maintain some part of the engine, such as turbine inlet temperature, for example, at a maximum allowable value, as determined by the physical properties of the materials used in the engine, and controlled to avoid compressor surge. The temperature level is generally controlled in one of two ways. If the gas turbine engine is of the adjustable turbine inlet nozzle type, coordination of the opening and closing movements of the nozzles with changes in compressor speed and fuel supply will maintain the engine at its maximum allowable operating temperature. In a gas turbine engine having fixed inlet nozzles, compressor speed generally is governed by the fuel flow control to maintain the desired maximum temperature and to avoid compressor surge.

One of the objects of the invention is to provide a selective two- or four-wheel drive of a motor vehicle driven by a gas turbine engine.

Another object of the invention is to provide a four wheel drive of a gas turbine driven motor vehicle in which the drive from the engine to one of the driving axles is through a slippable clutch, the slip being controlled as a function of compressor speed to control the loading of the compressor and thereby engine temperature.

It is a still further object of the invention to provide a four wheel drive for a gas turbine driven motor vehicle in which the engine is of the free power turbine type; the power turbine being connected through reduction gearing and transmission and drive shaft means to one of the driving axles; the other driving axle being selectively coupled to the gasifier section of the gas turbine engine by a slippable clutch; the slip therethrough varying with changes in compressor speed so as to variably load the compressor shaft according to a predetermined schedule to maintain the turbine inlet temperature either at its maximum allowable value or to a level avoiding compressor surge.

Other objects, features and advantages of the invention will become apparent upon reference to the succeeding detailed description thereof, and to the drawings illustrating one embodiment thereof, wherein:

FIGURE 1 illustrates, schematically, a motor vehicle two-four wheel drive arrangement embodying the invention; and, FIGURE 2 illustrates, schematically, a control system for regulating the operation of a portion of the drive arrangement illustrated in FIGURE 1.

FIGURE 1 shows a motor vehicle having front and rear driving axles 10 and 12 for driving, respectively, the pairs of front and rear wheels 14 and 16. Both axles have a conventional differential, 18 and 20, the front axle additionally including universal joints indicated at 22 permitting steering control of wheels 14 by a steering mechanism, not shown.

The power for driving axles 10 and 12 in this case is provided by a gas turbine engine of the fixed turbine inlet nozzle, free power turbine type, illustrated schematically at 24. It includes a gasifier section 26 including a centrifugal compressor 28 connected by a shaft 30 to a compressor turbine 32. Axially adjacent compressor turbine 30, but freely rotatable with respect to it, is a power output turbine 34 integral with a power output shaft 36.

Further details of construction and operation of the gas turbine engine are not given since they are known and are believed to be unnecessary for an understanding of the invention. Suffice it to say that the engine would have the usual burner section, regenerators or recuperators, the air discharging from compressor 28 passing through the heat exchanger absorbing the heat of the exhaust gases passing therethrough, in the normal manner, on its way to the burner can, at which point fuel is introduced and the exhaust gas products generated directed against and through the compressor and free power turbines for driving the two.

In this case, the free power turbine output shaft 36 is connected at all times to rear axle 12 through reduction gearing indicated in general at 40, to the input of a transmission indicated at 42, the output rotating a final drive shaft 44. The drive shaft in turn drives rear axle 12 through differential unit 20.

The gas turbine engine 24 also is adapted to be selectively coupled to front driving axle 10 to provide various modes of operation of the vehicle. More specifically, a step down type of accessory drive train, indicated in general at 46, is driven by compressor shaft 30. In addition to driving the normal accessories of the gas turbine engine, gear train 46 also drives the power input member 48 of a slippable clutch 50. Clutch 50 may be of a known fluid viscous friction type. It is spring released, and operates through the agency of a thin film of liquid to transmit torque between a driving friction plate 48 and a driven friction plate 52, with varying degrees of slip, in a known manner.

Driven clutch member 52 is axially slidably splined on a shaft 54 that constitutes the drive input member to differential 18. The forward terminal portion of clutch member 52 is formed as an annular piston 56 that is slidably and sealingly movable within an annular opening in a cylinder 58. An annular fluid pressure chamber 60 is thus defined between the piston and the cylinder. A fluid inlet 62 permits pressurization of chamber 60 to the degree desired to control the slip between the driving and driven clutch portions 48 and 52, in a manner to be described more fully later.

As stated previously, gas turbine engine 24 generally operates within a maximum allowable turbine inlet temperature range that is determined by the physical properties of the materials used in the engine, as varied by speed and other controlling parameters to avoid compressor surge. In this particular instance, the maximum allowable temperature schedule is maintained by the automatic loading or unloading of compressor shaft 30 by means of the slippable clutch connection to front axle 10. The slip is varied with changes in compressor speed to slow down or speed up compressor shaft 30 and thereby directly influence the fuel flow to the engine and thereby turbine inlet temperature. More specifically, for any given compressor speed, there is a predetermined fuel flow that normally will schedule the turbine inlet temperature at its maximum allowable value and yet avoid compressor surge. If the temperature should change for any reason, the clutch engaging pressure in port 62 also should change to load or unload compressor shaft 30 sufficiently so that the fuel control governor sensing the change will change fuel flow in an attempt to restore the compressor speed to its previous level. This change in fuel flow will automatically change the turbine inlet temperature and restore it to the maximum allowable value. This, of course, is a progressive process, and is completed when the system is in equilibrium.

Thus, during normal driving operations, the degree of torque transmission to front axle 10 will vary in accordance with changes in compressor speed in a manner to always maintain the turbine inlet temperature at its maximum allowable value.

The pressure level control of clutch 50 is also used to provide other operating conditions of the vehicle. For example, when acceleration of the vehicle is desired, clutch 50 will be completely disengaged to unload the compressor and permit it to accelerate rapidly to the desired level. Also, if engine braking is desired when the vehicle is coasting, full engagment of clutch 50 is called for, so that front axle 10 will drive the gasifier section and thereby retard forward movement of the vehicle.

Control of clutch 50 to provide the above three conditions of operation may be obtained in a number of ways, FIGURE 1 illustrating, schematically, one in particular. As shown, the fluid pressure supplied to clutch 50 is provided by a pump 64 that may be driven, for example, by an electric motor, not shown, or by a power takeoff from accessory gear train 46. The pump has the usual intake and discharge lines 65 and 66, the pressure in line 66 being controlled by a conventional pressure regulator valve indicated in general at 68. The pressure regulator 68, in this case, has an output line that is connected in parallel to a flow control switch 70, through a line 71, and through a line 72 to the input of a speed responsive pressure modulator indicated in general at 74, and more specifically in FIGURE 2. This latter modulator will be described in more detail later. Its function is to control the slip of clutch 50 in the manner previously described to load or unload the compressor, as the case may be, to cause more or less fuel flow to the burner can and thereby directly control the turbine inlet temperature to the desired value. As indicated, the speed responsive modulator is driven by a connection 76 to the gasifier section shaft 30.

Flow control switch 70 is a three-position valve. In the position shown, the valve blocks the direct flow of fluid under pressure from pressure regulator 68 to clutch 50 inlet line 78, while connecting outlet line 79 from pressure modulator 74 to line 78. When moved to the right, line 79 is blocked while pressure regulator line 71 is open to clutch supply line 78. When valve 70 is moved to the extreme left, both lines 71 and 79 from pressure regulator 68 and speed modulator 74 are blocked, and clutch supply line 78 is vented.

Three-way valve 70 can be moved to its various positions in any suitable manner, either manually, or automatically in response to the actuation of an electrical signal, for example.

Referring now to FIGURE 2, the speed responsive pressure modulator 74 includes a fluid pressure speed signal generator 80; a set temperature pressure generator 82; a bimetal turbine inlet temperature sensitive probe 84; and a comparator 86 that compares actual turbine inlet temperature to the desired or set temperature generator signal to automatically provide the scheduled fluid pressure acting against piston 56 of clutch 50.

More particularly, the speed signal generator 80 consists of a laterally offset cylindrical end housing 88 that is attached to a rotatable shaft 90 operatively driven by compressor shaft 30, as indicated in FIGURE 1. The bore of housing 88 constitutes a chamber 92 that slidably contains a fluid metering piston 94 of predetermined mass. The piston is biased by a spring 96 against the port end of a cylindrical vent passage 98 that is fixed to the housing and leads to the fluid sump. The space between the port, the end of piston 94, and the walls of housing 88 defines an annular fluid pressure chamber 100 that is connected through a central bore 102 in shaft 90, and an orifice 104 to pressure regulator 68 and pump 64.

In operation, the mass of piston 94 and the force of spring 96 will be chosen so that at zero or some preselected speed of shaft 90, piston 94 initially will be seated against the end of passage 98 to block the drain of fluid from bore 102 to the sump. As the speed signal generator rotates, the force of the spring 96 and centrifugal force acting on piston mass 94 will maintain passage 98 closed until the back pressure buildup in chamber 100 has risen to a point just above these forces. Passage 98 then will be cracked open and begin to bleed fluid to the sump. For any given speed, therefore, piston 94 will oscillate back and forth until an equilibrium position is obtained where the fluid pressure forces exactly balance the centrifugal and spring forces, thereby providing a predetermined level to the pressure in line 102. Accordingly, as the speed of shaft 90 changes, the fluid pressure level will also change, to follow a parabolic curve pattern, in a known manner.

The back pressure in chamber 100 and passage 102 is reflected through a line 110 to the desired or set temperature generator 82. It includes a fluid pressure chamber 112 that is divided into two portions 114 and 116 by a flexible annular diaphragm 118. Upper chamber 114 is directly connected to speed signal generator line 110. The lower chamber 116 has an inlet 120 connected by a line 122 to the output of pressure regulator 68 at a location upstream of orifice 104. The orifice isolates the output pressure of regulator 68 from the influence of the speed signal generator in a known manner.

The set temperature generator chamber 116 also has a variable area outlet opening 124, the area of which is controlled by a movable needle valve 126 secured to diaphragm 118. The diaphragm is biased upwardly by a spring 128 against the force of a centering spring 129 so as to initially to provide a predetermined size opening to outlet 124 providing a predetermined pressure drop of the fluid from line 122 into a desired or set pressure line 130. In effect, therefore, needle valve 126 constitutes a pressure regulating valve variably controlling the pressure in line 130 as a function of speed changes. Line 130 contains the usual orifice 132, the downstream portion 134 of which is vented to the fluid sump. Line 130 is connected to one side of comparator 86.

Fluid pressure line 122 has a branch portion 136 that is further branched into two lines 137 and 138. Line 137 directs a controlled pressure to the lower side of comparator 86 to provide a differential force on the comparator. This latter force controls the position of the comparator to regulate the flow of fluid under pressure from branch line 138 to clutch 50 apply pressure line 78.

More specifically, flow through line 137 is controlled by a metallic temperature sensing probe 84. Probe 84, in this case, would project into the turbine section of the gas turbine engine so as to be sensitive to the temperature therein. As shown, the probe consists of an assembly of a fixed outer tubular housing 139 of, say, steel, for example, loosely enclosing a ceramic rod 140. The rod is secured to a tapered needle-like valve 142 that controls the flow of fluid and the pressure drop between line 137 and a line 144. Valve 142 and rod 140, in this instance, are biased to the left by a spring 146 to an initial set position providing a predetermined minimum flow or communication of fluid between lines 137 and 144, and acts as pressure controlling valve.

In operation, valve 142 initially would be positioned to indicate a predetermined turbine gas inlet temperature. Variances above or below this temperature will expand or contract the steel housing axially faster than the ceramic rod, and permit spring 146 to move the rod to the left or the rod to be moved to the right against the spring, as the case may be, to allow more or less communication between lines 136 and 144.

Comparator 86 consists of a valve 148 that is secured at opposite ends to annular flexible diaphragms 150 and 152. The diaphragms are sealingly secured to the walls of chambers 154 and 156 formed in a valve body, and each biased towards the other by centering springs 157 and 158. The diaphragms subdivide the chambers 154 and 156 into further chambers 159, 160, 161, and 162, chambers 160 and 162 being vented, as shown. Chamber 159 receives the fluid under pressure from the desired pressure line 130, while chamber 161 receives the pressure from line 144.

Valve 148 is of the spool type having a pair of lands 163 and 164 connected by a neck portion 165 of reduced diameter. The neck portion defines a fluid pressure annulus 166 that cooperates at all times with branch line 138 on one side, and the fluid pressure outlet line 79, shown in FIGURE 1. In effect, the comparator 86 senses the desired or set pressure in line 130 and the sensed or actual temperature signal pressure in line 144, the differential between the two moving the valve up or down, as the case may be, to admit more or less fluid from pump line 138 into the discharge line 79.

*Operation*

Consider first the two extreme conditions of operation of slip clutch 50. Assume that it is desired to start the gas turbine engine 24, or accelerate the engine if it is at idle speed operation. The control 176 (FIGURE 1) will be actuated so that the three-way switch 70 is moved to the left from the position shown to block both lines 71 and 79 from the pressure regulator 68 and speed modulator 74, respectively. Accordingly, any fluid pressure in clutch apply line 78 will drain through the line 178, and the clutch spring will disengage the clutch. Clutch 50, therefore, is completely uncoupled and the gasifier section is free to be rotated without the additional load of the front axle 10 being imposed thereon. A fast acceleration of the gasifier section to the desired level, will, therefore, be obtained due to the low inertial load at this time.

Assume now the vehicle has been accelerated, and a coasting condition of the vehicle occurs. If it is desired to provide engine braking, control 176 is operated by the driver to move three-way switch 70 to the extreme right so that line 71 from pressure regulator 68 is connected directly to the clutch supply line 78, while line 79 from the speed modulator 74 is blocked. Accordingly, fluid pressure at the maximum output level of regulator 68 will flow through the clutch inlet port 62 to act against piston 56 of clutch 50 and thereby fully engage the clutch. This will provide the maximum connection between axle 10 and the compressor 28, thereby causing a drive of the compressor and the gasifier section by the front axle 10. This will result in a slowdown of the vehicle.

Assume now that a normal four-wheel drive of the vehicle is desired. The operator will move control 176 to reposition the three-way valve 70 to the position indicated in FIGURE 1. In this position, line 71 from pressure regulator 68 is blocked, while the output in line 79 from the speed modulator 74 is connected directly to clutch supply line 78. This supplies fluid under pressure to the clutch 50 at a level that varies according to compressor speed.

More specifically, referring to FIGURE 2, for a given compressor speed, the pressure in line 110 acting on diaphragm 118 of the desired or set temperature pressure generator 82 will be at a scheduled value. The output pressure from regulator 68 at this time will be reflected in chamber 116 of the set temperature generator. The difference between the two pressures will position needle valve 126 to provide a scheduled pressure in line 130, the desired pressure for this particular compressor speed. This, of course, is reflected against diaphragm 150 of comparator 86.

At the same time, the output pressure of regulator 86 is bled through the actual temperature probe controlled valve 142 to the sensed temperature pressure line 144 to provide a predetermined pressure in chamber 161 of comparator 86. The difference between the pressures in comparator chambers 159 and 161 will position spool valve 148 upward or downward, as the case may be, to open or close down communication between supply line 138 and the output pressure line 79. Therefore, if the gas turbine inlet temperature sensed by probe 84 is correct for the particular speed at which the compressor is rotating, then the pressure in line 79 will be such as to cause a predetermined slip of the clutch 50 providing a predetermined desired load on the compressor shaft 32 that will maintain the compressor speed at this level. This predetermined load will, through the fuel control system compressor governor normally provided in the gas turbine control system, schedule a predetermined fuel flow to the engine burner can to maintain the sensed turbine inlet temperature. At this time, therefore, the pressure on the slippable clutch is correct to provide the temperature desired.

Assume now that probe 84 indicates that the turbine inlet temperature is lower or higher than that permissible for this particular compressor speed, to avoid compressor surge, or to avoid an over temperature condition of the engine. The higher temperature will move the probe housing 139 to the left and permit a similar movement of rod 140 by spring 146. This moves valve 142 to increase the fluid pressure level in line 144 and chamber 161 of comparator 86. Since the desired set pressure signal in chamber 154 remains the same for this particular engine speed, the spool valve 148 will be moved upwardly by the higher pressure in chamber 161 and admit more fluid to line 79 from line 138 to thereby decrease the clutch apply pressure. Therefore, the clutch 50 now slips more than before and less load is imposed on compressor drive shaft 30. This permits a speed up of compressor 28, sends a signal to the fuel system compressor governor that will accordingly decrease the fuel supply to the engine and thereby lower the turbine inlet gas temperature. Accordingly, this change in clutch apply pressure will continue for so long as the turbine inlet temperature remains above the desired or critical value. If it should drop below the desired value, the opposite action, of course, will occur. That is, the desired or set pressure then will be higher than the pressure in line 144 (the sensed temperature pressure) and more fluid under pressure will be admitted to the clutch apply line 79. Less slip of the clutch then will occur, and more loading of the compressor, resulting in more fuel being fed to the engine and a higher gas inlet temperature.

The above regulation of the clutch supply pressure will, therefore, vary until the turbine gas inlet temperature is correct or maximum for the particular compressor speed in question, to avoid compressor surge while maintaining the temperature at its maximum allowable value.

From the foregoing, therefore, it will be seen that the invention provides a four-wheel drive arrangement of a motor vehicle driven by a gas turbine engine that permits either a four or two-wheel drive arrangement as a function of the operating conditions desired; that is, a four-wheel drive arrangement for normal cruising operation of the vehicle, a two-wheel drive arrangement during acceleration of the vehicle, and a four-wheel drive arrangement to provide engine braking during coasting of the vehicle.

While the invention has been illustrated in its preferred embodiment in the drawings, it will be clear to those skilled in the arts to which it pertains that many changes and modifications may be made thereto without departing from the scope of the invention.

What is claimed is:

1. A motor vehicle having front and rear wheel axles, and means for selectively driving said axles, said means including a gas turbine engine of the free turbine type having a gasifier section including a compressor and turbine interconnected by a common shaft, said means also including a power turbine driven by the flow of exhaust gases thereagainst from said gasifier section and mounted for rotation relative thereto, torque transmitting means operably connecting said power turbine and one of said axles for the drive thereof by said power turbine, and selectively operable control means operably connecting said gasifier section at times to the other of said axles for the drive thereof, said control means including a slippable fluid pressure actuated clutch, a source of fluid under pressure connected to said clutch, and pressure controlling means operably connected between said source and compressor for varying the pressure of the fluid from said source and thereby the slip of said clutch to vary the load on said compressor.

2. A motor vehicle as in claim 1, said control means including selectively operable means between said source and said clutch selectively controlling the supply of or nonsupply of fluid to said clutch.

3. A motor vehicle as in claim 2, said control means including gear means connecting said compressor and a driving member of said clutch, said clutch having a driven member axially movably mounted relative to said drive member, spring means biasing said members apart, and means operably connecting said fluid pressure to act on said clutch driving member for axially sliding said driven members into engagement with said driving member.

4. A motor vehicle as in claim 2, said pressure controlling means including speed responsive means including a speed sensor operably connected to said compressor, said pressure controlling means also including a pressure regulating means connected to said source and said clutch for regulating the pressure of the clutch actuating fluid, and means connecting said speed sensor to said pressure regulating means for varying the pressure regulated as a function of the changes in speed of said compressor.

5. A motor vehicle as in claim 2, said torque transmitting means including gear reduction means drivenly connected to said power turbine and driving the input member of a transmission, a drive shaft connected to said one axle, and means connecting said drive shaft and an output member of said transmission.

References Cited

UNITED STATES PATENTS

| | | |
|---|---|---|
| 2,707,865 | 5/1955 | Huebner. |
| 2,916,098 | 12/1959 | Millar. |
| 3,339,663 | 9/1967 | Anderson. |

A. HARRY LEVY, *Primary Examiner.*

U.S. Cl. X.R.

60—39.16; 180—66, 105; 192—32